United States Patent [19]

Ogura

[11] 3,957,943
[45] May 18, 1976

[54] METHOD FOR PRODUCING GLASS FIBER REINFORCED PLASTIC MOLDED ARTICLES WITH DECORATIVE PATTERNS AND ARTICLE PRODUCED THEREBY

[75] Inventor: Shoji Ogura, Hamamatsu, Japan

[73] Assignee: Nippon Gakki Seizo Kabushiki Kaisha, Japan

[22] Filed: Dec. 23, 1974

[21] Appl. No.: 535,289

Related U.S. Application Data

[63] Continuation-in-part of Ser. No. 304,718, Nov. 8, 1972, abandoned.

[30] Foreign Application Priority Data

Nov. 9, 1971  Japan.............................. 46-89264

[52] U.S. Cl............................... 264/245; 264/246; 264/247; 264/258
[51] Int. Cl.² ......................................... B29C 9/00
[58] Field of Search ........... 264/245, 246, 247, 258, 264/77, ; 428/207, 210, 195

[56] References Cited

UNITED STATES PATENTS

| | | | |
|---|---|---|---|
| 2,565,941 | 8/1951 | Wellman.......................... | 264/246 X |
| 2,618,019 | 11/1952 | Orsini .................................. | 264/77 |
| 2,688,580 | 9/1954 | Fingerhut........................ | 264/247 X |
| 2,956,916 | 10/1960 | Voss ................................... | 264/258 X |
| 3,101,994 | 8/1963 | Hartmann........................... | 264/247 |
| 3,198,686 | 8/1965 | Caligari............................ | 428/210 X |
| 3,730,808 | 5/1973 | Fekete ............................. | 161/156 |

Primary Examiner—Richard R. Kucia
Attorney, Agent, or Firm—Lerner, David, Littenberg & Samuel

[57] ABSTRACT

A method for producing glass fiber reinforced plastic molded articles with decorative patterns thereon is provided, which method includes the steps of placing at least two kinds of differently colored sheet molding compound (SMC) mat layers on a stationary mold, each of the SMC mats including glass fibers impregnated with resin, the resin in each of the SMC mats including different colorants, the area of each SMC mat layer occupying less than the total effective molding surface area of the stationary mold surface, disposing a movable mold in engagement with the stationary mold with the SMC mat layers interposed between such molds, and applying heat and pressure to the molds so as to fluidize and polymerize and cure the resin in the SMC mats. When fluidized, the two kinds of differently colored mats are mingled with each other to form flow patterns comprised of the distinct colors of each of the mats. Inasmuch as the total area of each of the SMC mat layers occupies less than the total effective molding surface area of the stationary mold, there will be sufficient space between the stationary mold and movable mold to allow the resin in each SMC mat layer when heat and pressure are applied thereto, to flow and fill the remaining space between the molds and be mingled with resin from the other SMC mats to form flow patterns of the colors of the mats. The final article produced will thereby include a decorative pattern of colors on at least one surface thereof.

4 Claims, 7 Drawing Figures

METHOD FOR PRODUCING GLASS FIBER REINFORCED PLASTIC MOLDED ARTICLES WITH DECORATIVE PATTERNS AND ARTICLE PRODUCED THEREBY

REFERENCE TO OTHER APPLICATIONS

This application is a continuation-in-part of application Ser. No. 304,718 filed Nov. 8, 1972, now abandoned.

FIELD OF THE INVENTION

This invention relates to a method for producing molded articles and the articles thereby produced. More particularly, the invention relates to a method for producing patterned fiber reinforced plastic articles in which sheet molding compound (SMC) mats are used, and the articles produced thereby.

BACKGROUND OF THE INVENTION

It is known to employ sheet molding compound mats, hereinafter referred to as "SMC mats," for use in producing molded articles made of glass fiber reinforced plastic, hereinafter referred to as "FRP." Until now, if it has been desired to form decorations or color patterns on the surface of such FRP molded article, the decorations or patterns have been painted on the outer surface of the FRP molded article after the molding process has been completed. Such a decorating step is a laborious and time consuming step which significantly lowers productivity, thereby causing an increase in the production cost of each of the articles decorated.

OBJECTS

Therefore, it is an object of the present invention to provide an improved method for producing decorated FRP molded articles in which the above-mentioned disadvantages are eliminated. A further object of the present invention is to provide a method for producing FRP molded articles with desirable color patterns on their surfaces in a simple, efficient and economical manner.

DEFINITIONS

The term "sheet molding compound mat" or "SMC mat" as employed herein refers to a flowable thermosetting resin impregnated glass mat type reinforcement which has been prethickened with, for example, oxides or hydroxides of metals of Group II (such as magnesium hydroxide, calcium hydroxide and the like), wherein the thermosetting resin may comprise from about 15 to about 70 % by weight of the total SMC mat and may comprise polyester resin, epoxy resin or other thermosetting resin, and the glass contained therein comprises glass fibers having a length ranging from ¼ to 3 inches, the glass fibers being present in an amount ranging from 5 to 40% by weight of the total SMC mat.

SUMMARY OF THE INVENTION

In accordance with the present invention, a plurality of differently colored SMC mats are employed in one molding process to produce patterned or decorated FRP molded articles. Thus, the present invention is directed to a method for producing a glass fiber reinforced plastic molded article having a decorative pattern on at least one of the outer surfaces or faces thereof, which is formed from at least two sheet molding compound mats (SMC mats), each of the mats comprising glass fibers impregnated with thermosetting resin, the resin impregnated in each of the mats including different colorants to provide at least two mats of different color, and the resin in each of the mats being present in sufficient quantity to be fluidized upon application of heat and pressure thereto. The method includes the steps of separately placing the at least two kinds of differently colored SMC mats on the molding surface of a stationary mold, the total area of each of the SMC mats placed on the stationary mold being less than the total effective molding surface area of the stationary mold, with the total volume of the SMC mats being sufficient to comprise 100% of the volume of the article produced in accordance with the present invention, putting together a movable mold onto the stationary mold with the SMC mats interposed therebetween, applying heat and pressure to the complete mold formed by the stationary mold and movable mold, thereby fluidizing the differently colored resin in the SMC mats so as to cause the differently colored resins to flow and be mingled with each other in the mats and on at least one of the outer surfaces of the mats, and curing the SMC mats between the stationary mold and the movable mold. In this manner, the differently colored SMC mats are mingled with each other to form a flow pattern of the colors of the resins therein, in the article so-molded including on at least one of the outer surfaces of the molded article. As will be seen, the pattern so-formed will retain the distinct colors of each of the resins. Thus, the colors of the fluidized resins do not mix to form new colors, but are essentially disposed side-by-side or surround each other in the molded article.

By means of the above mentioned method of the present invention, a variety of interesting patterns can be easily formed, which patterns are permanently disposed in the molded article and will not be scraped or scratched off therefrom as in the case of patterns formed by painting techniques as employed in the prior art. Thus, articles produced in accordance with the method of the invention will retain its decorative patterns for substantially as long as the article is intact.

It is essential in carrying out the method of the present invention that the largest surface of each of the SMC mats or layers formed therefrom and disposed on the stationary mold has an area less then the total effective molding surface area of the stationary mold, and preferably is within the range of from about 5 to about 90 % of said molding surface area. Thus, upon application of heat and pressure on the SMC mats by means of the stationary mold and the movable molds, there is sufficient space between the SMC mats and the molding surfaces such that the fluidized resins in the SMC mats flow into the remaining space between the SMC mats and the mold portions. Thus, in effect, the colored resin on one SMC mat flows into the colored resins of the other SMC mats thereby forming a resin layer having striped patterns or other complicated patterns. The colors in the resins do not actually mix to form a single new color from a variety of colors, but, each resin retains its respective color and the colored resins merely flow about each other so that the final article produced includes color patterns which includes each distinct color of each resin employed in the separate SMC mats.

It will be appreciated that if each SMC mat layer is placed on a stationary mold such that each mat completely covers the molding surface of the stationary mold, that is the area of each mat is equal to the total area of the molding surface of the stationary mold, then, in such case, there would not be sufficient space or room for the resin in the SMC mat layers to flowingly move, and therefore, the resin in each of the SMC mat layers cannot form the flow patterns in accordance with the method of the present invention.

Although the various SMC mat layers disposed on the stationary mold each have an effective area less than the effective molding surface area of the stationary mold, the total volume of the SMC mat layers will comprise the total volume of the molded article to be produced.

DESCRIPTION OF THE INVENTION

Now referring to the accompanying Figures, a mold set up is shown for use in forming a glass fiber reinforced plastic (FRP) molded bathtub.

Figure 1:
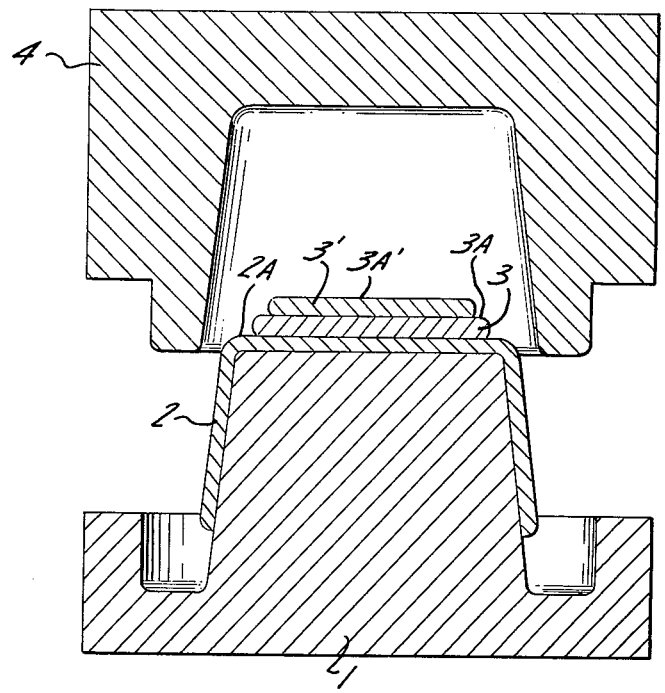
FIG. 1 is a schematic vertical sectional view of a set of molds and SMC mats placed therebetween.
Figure 2:
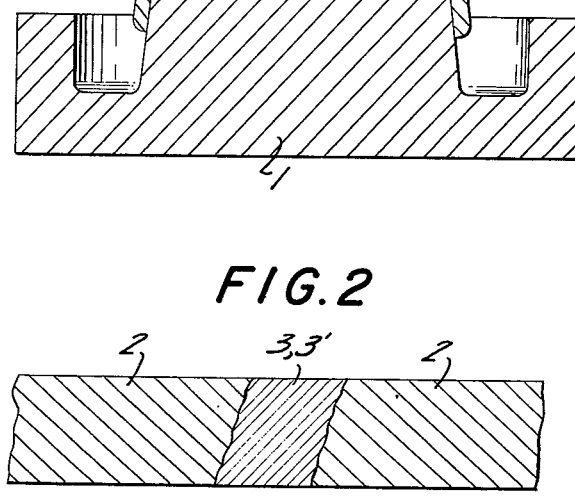
FIG. 2 is a fragmentary view of a portion of the molded article produced in accordance with the present invention.

As seen in FIG. 1, an SMC mat 2 containing a suitable colorant or colorants is placed on a stationary mold 1, the area of the SMC mat 2 being less than the molding surface area of the stationary mold 1. Thereafter, one, two or more SMC mats (SMC mats 3 and 3' being shown) containing a different colorant or colorants from the colorant or colorants contained in SMC mat 2 are placed on the SMC mat 2, the surface area of each of the SMC mats 3, and 3' being less than the total effective molding surface area of the stationary mold 1. However, the total volume of the SMC mats 2, 3 and 3' is equal to the volume of the final article or bathtub to be produced. Thereafter, a movable mold 4 is placed on the stationary mold 1 and the set of molds 1 and 4 are clamped together and subjected to heat and pressure, such as a temperature within a range of from about 100 to about 160°C and a pressure above 20 kg/cm². During the step of applying heat and pressure to the set of molds 1 and 4, the SMC layers 2, 3 and 3' in the cavity formed by the molds 1 and 4 are fluidized so that the resins thereof flow into the remaining space in the SMC layers 2, 3 and 3' and between the mold surfaces to fill the cavity. The result is that the differently colored resins in the SMC mats 2, 3 and 3' flow and are mingled with each other to form a flow pattern in and on at least one outer surface of the molded article, which flow pattern essentially retains the original colors present in the SMC layers 2, 3 and 3'. The fluidized materials are polymerized and hardened with the process of the heating and pressure application steps to form the molded article or bathtub. As shown in FIG. 2, the SMC layers 2, 3 and 3' move with respect to each other to form a flow pattern of the original colors of the layers 2, 3 and 3'. As shown in FIG. 2, the colors of the resins in the two SMC mat layers 3 and 3' are the same but differ from the color of the resin in the SMC mat layer 2.

In the above-described method, the differently colored SMC mats 2, 3 and 3' are used. However, three or more of such SMC mats having colors different from one another may be used to obtain interesting and beautiful patterns. In addition, if desired, the SMC mats may be placed side by side on the stationary mold 1 to form distinct decorative patterns.

The following examples represent preferred embodiments of the present invention:

EXAMPLE 1

Referring to FIG. 1, a bathtub having a pattern on at least one of its outer surfaces was formed in accordance with the present invention as follows.

A SMC mat layer 2 having a thickness of about 3 mm was placed on a stationary mold 1 such that the area of the surface 2A of the SMC layer 2 was about 60% of the effective molding surface area of the stationary mold 1, and the total volume of the SMC mat layer 2 was about 60% of the total volume of the molded article to be produced. The SMC mat layer 2 had the following composition:

Composition of SMC mat 2:

| a) Glass fiber content: (½ inch in length) | 30% by weight |
|---|---|
| b) Components of resin: | |
| Polyester resin | 100 parts by weight |
| Calcium carbonate (as filler) | 100 parts by weight |
| Zinc stearate (as parting agent) | 3 parts by weight |
| Titanium white (as colorant) | 20 parts by weight |
| Titan yellow (as colorant) | 1 part by weight |
| Magnesium oxide (as thickening agent) | 0.6 part by weight |
| t-butyl perbenzoate (as catalyst) | 1 part by weight |

Thereafter, two layers identified by the numerals 3 and 3' of SMC mats each having a thickness of about 3.5 mm was placed in layers one on top of the other and superimposed on the SMC mat layer 2 so that the SMC mat layer 3 was sandwiched between the SMC mat layers 2 and 3'. The surface (3A) area of the SMC mat layer 3 was about 20% of the effective molding surface area of the stationary mold 1, and the surface (3A') area of the SMC mat 3' was about 18% of the effective molding surface area of the stationary mold 1. However, the total volume of the SMC mat layers 3 and 3' was about 40% of the total volume of the molded article to be produced so that the three SMC mat layers 2, 3 and 3' was equal to the total volume of the molded article to be produced.

The composition of the SMC mat layers 3 and 3' is set out below:

Composition of SMC mat layers 3 and 3':

| a) Glass fiber content: (½ inch in length) | 30% by weight |
|---|---|
| b) Components of resin: | |
| Polyester resin | 100 parts by weight |

-continued
Composition of SMC mat layers 3 and 3':

| | |
|---|---|
| Calcium carbonate (as filler) | 40 parts by weight |
| Powdered calcite (as colorant) | 30 parts by weight |
| Zinc stearate (as parting agent) | 3 parts by weight |
| Magnesium oxide (as thickening agent) | 0.6 part by weight |
| t-butyl perbenzoate (as catalyst) | 1 part by weight |

A movable mold 4 was placed on the SMC mat layers 2, 3 and 3' and the stationary mold 1. The set of molds 1 and 4 were clamped and subjected to heat and pressure so that the stationary mold was maintained at a temperature of about 140°C and the movable mold was maintained at a temperature of about 130°C, the pressure on the SMC mat layers being maintained at about 60 kg/cm² for about 5 minutes (the pressurizing speed, i.e. velocity of movable mold, being 2 mm/sec.).

The SMC mats were thereafter allowed to cool in the cavity between the molds 1 and 4. The molded bathtub thereby produced had a pleasant pattern formed on an outer surface thereof which pattern includes the separate colors of the separate SMC mat layers 2, 3 and 3'.

EXAMPLE 2

Figure 3:
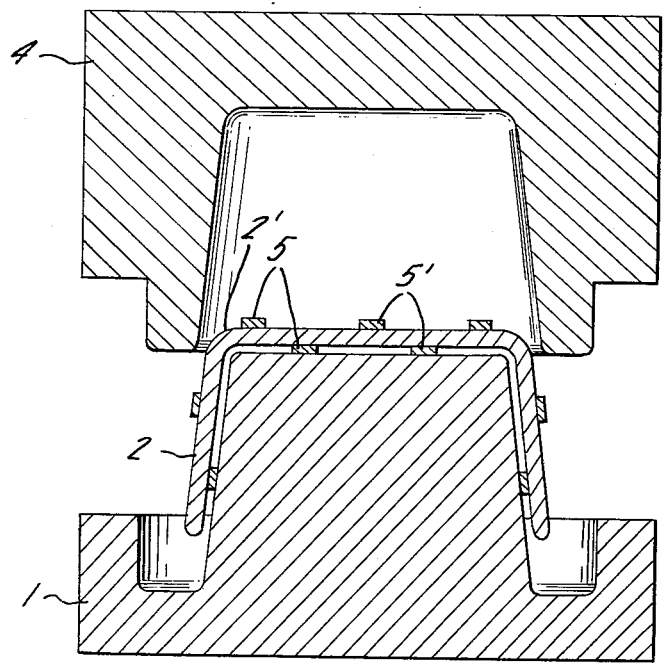
FIG. 3 is a schematic vertical sectional view of a set of molds and SMC mats placed therebetween for use in forming a molded article having a different type of decorative pattern thereon than produced with the embodiment shown in FIG. 1.

Referring now to FIG. 3, a molded bathtub having decorative patterns on two outer surfaces thereof was formed in accordance with the present invention as follows.

An SMC mat layer 2, having the same composition as the SMC mat layer 2 described in Example 1, was disposed on the mold surface of a stationary mold 1. The SMC mat layer 2 had a surface (2') area of about 90% of the total effective molding surface area of the stationary mold 1, and a volume comprising 90% of the volume of the final article produced. A number of relatively small SMC mat layers 5 having a thickness of about 1.5 mm was disposed beneath the SMC mat layer 2 and on top of the SMC mat layer 2 as shown in FIG. 3. The surface (5') area of each of the SMC mat layers 5 disposed both beneath and on top of the SMC mat layer 2 comprised about 10% of the total effective molding surface area of the stationary mold 1 and about 10% by volume of the total volume of the article to be produced. Thus, there will be sufficient space between the SMC layers and the stationary mold 1 and the movable mold 4 (discussed below) to allow the resins in each SMC layer to flow and mingle with each other.

The composition of the SMC mat layers 5 was the same as the composition of the SMC mat layers 3, 3' described in Example 1 with the exception that the glass fibers were about ¼ inch in length.

The movable mold 4 was placed on the SMC mat layers 2 and 5 and the stationary mold 1 as described in Example 1, and the SMC mat layers were subjected to heat and pressure, the stationary mold 1 being maintained at about 150°C and the movable mold 4 being maintained at about 135°C, to supply a pressure on the SMC mat layers of about 50 kg/cm² for 5 minutes (pressurizing speed, that is velocity of the movable mold against the stationary mold, being about 3 mm/sec).

The article produced by the above procedure included decorative patterns on both sides thereof which patterns are mainly concentrated near the outer surfaces of the article inasmuch as the SMC mat layers 5 do not contain a sufficient amount of resin to substantially penetrate into the core of the SMC mat layer 2.

It will also be appreciated that if desired, the resin in the SMC mats 5 disposed on either side of the SMC mat layer 2 may be selected so as to be less flowable than the resin in the SMC mat layer 2 so that during the heating and pressurizing step, the resin in the SMC mat layers 2 flows around the SMC mat layers 5 to form interesting patterns on both sides of the article produced.

It will thus be appreciated that in one embodiment of the invention the SMC mat layers will contain resins which have different flow properties so that upon application of heat and pressure thereto, the resins in the SMC mat layer will irregularly or non-homogeneously mix with each other to form a complicated pattern from such resins.

As disclosed in the above, the patterned bathtub can be produced easily by using at least two of differently colored SMC mats, and the mats need only be pressed and polymerized in the set of molds. Therefore, the method of the present invention is simple and easy, and suitable for the mass production process of molded articles. Further, such molded articles may be produced at a relatively low cost as compared with those produced at a relatively low cost as compared with those produced through prior art techniques.

Figure 4:
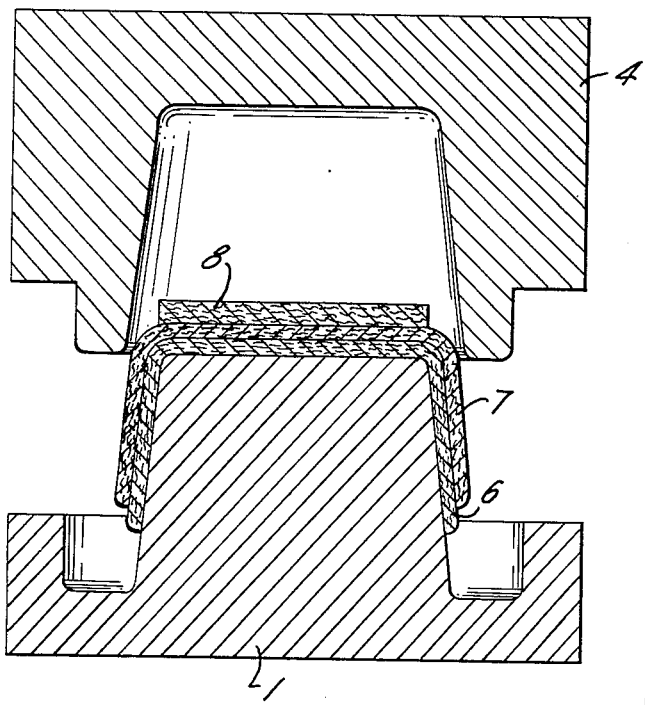
FIG. 4 is a schematic vertical sectional view of a set of molds and another set of SMC mats placed therebetween.
Figure 5:
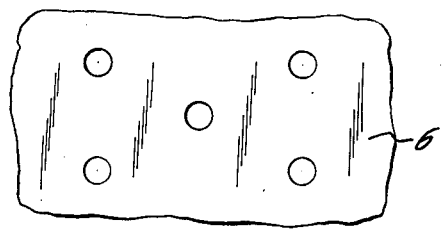
FIG. 5 is an elevational top view of the lower most SMC mat of FIG. 4.

Referring now to FIGS. 4 and 5, the SMC mat layer 6 was disposed on the mold surface of a stationary mold 1. The SMC layer 6 had a surface area of about 70% of the total effective molding surface area of the stationary mold 1. Secondly, a second SMC mat layer 7 having a surface area also of about 70% of the total effective molding surface area of the stationary mold 1, was disposed on top of SMC mat layer 6, and finally, a third SMC mat layer 8, having a surface area of about 30% of the total effective molding surface area of the stationary mold 1 was disposed on top of SMC mat layer 7. Referring to FIG. 5, the surface of SMC mat layer 6, in this case, included several holes therein, so that upon application of heat and pressure through movable mold 4 against stationary mold 1, the fluid resins of the fluidized SMC layers float into these spaces, as well as the remaining spaces between the mold surfaces, to fill the cavities therebetween.

Figure 6:
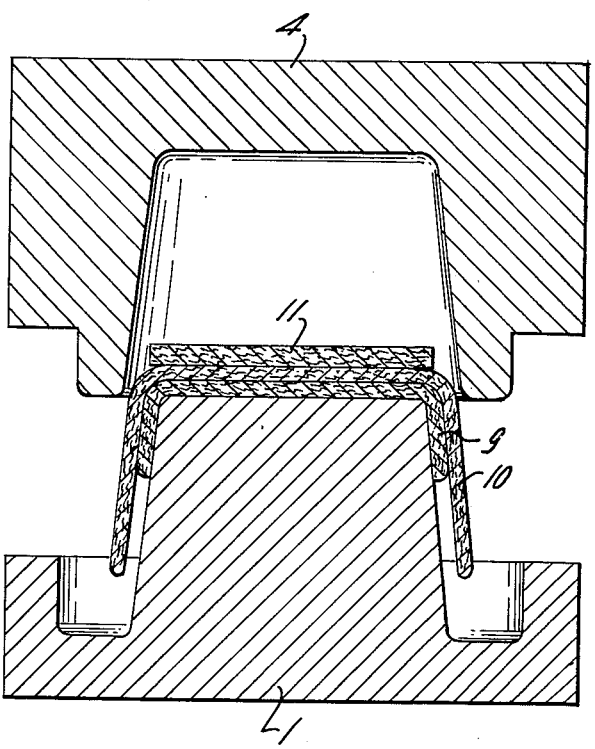
FIG. 6 is a schematic vertical sectional view of a set of molds and another set of SMC mats placed therebetween.

Referring now to FIG. 6, SMC mat layer 9, having a surface area of about 40% of the total effective molding surface area of stationary mold 1 was disposed directly upon stationary mold 1, followed by an SMC mat layer 10, thereover, having a surface area of about 70% of the total effective molding surface area of stationary mold 1. Finally, an SMC mat layer 11, having a surface area of about 30% of the total effective molding surface area of stationary mold 1 was placed upon SMC mat layer 10. Again, upon the application of heat and pressure, a further unique design based upon the various colors in SMC mat layers 9, 10 and 11 was achieved.

Figure 7:
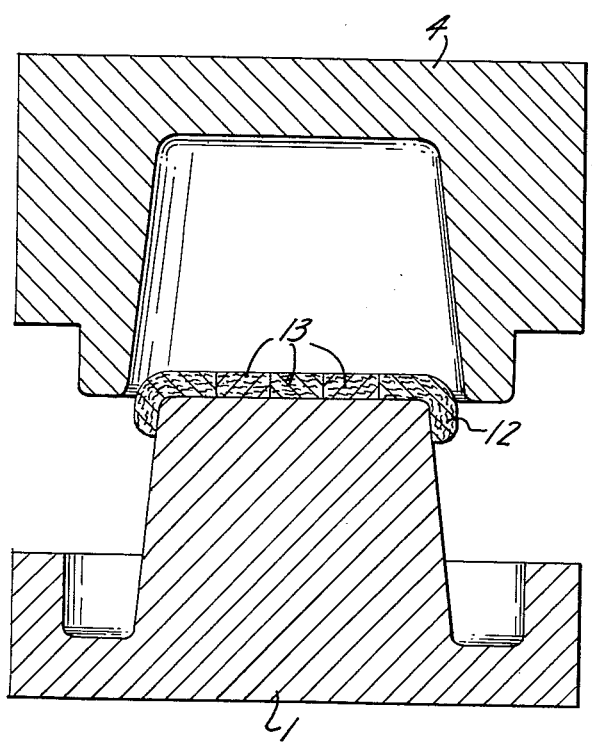
FIG. 7 is a schematic vertical sectional view of a set of molds and another set of SMC mats placed therebetween.

Finally, referring to FIG. 7, each of the SMC mats employed was arranged side-by-side upon stationary mold 1, in a manner such that the surface area of each of the SMC mats 12 at the ends was about 10% of the total effective molding surface area of stationary mold 1, while each of the intermediate SMC mats 13 had a surface area of about 5% of the total effective molding surface area of stationary mold 1.

The method of this invention is applicable not only to molding decorative bathtubs but also to such FRP molded articles as shrouds of snow-mobiles, walls, floors, or ceilings of bathroom units, and basin units.

It should be emphasized that the specific examples described and shown herein are intended as merely illustrative and in no way restrictive of the invention.

What is claimed is:

1. A method for producing a glass fiber reinforced plastic molded article comprising a pair of surfaces and an edge portion therebetween, and having a decorative pattern forming an integral part of at least one of said surfaces, which comprises the steps of providing at least two sheet molding compound mats, each of said mats comprising glass fibers impregnated with thermosetting resin, said resin impregnated in each of said mats including different colorants to provide at least two mats of different color, said resin impregnated in each of said mats being present in sufficient quantity and adapted to be fluidized upon application of heat and pressure thereto; separately placing said at least two kinds of differently colored sheet molding compound mats in separate layers on a first mold portion, the area of each mat being less than the molding surface area of said first mold portion; putting together a second mold portion on to said first mold portion with said layers of said sheet molding compound mats interposed between said first and second mold portions, said first and second mold portions forming a mold; applying heat and pressure to said mold, and fluidizing said differently colored resin in said layers of said at least two mats so as to cause said differently colored resins to flow in the space between said mats and mold portions and be mingled with each other in said mats, thereby forming an article comprising a single layer of a thickness substantially less than that of said layers of said sheet molding compound mat, and curing said sheet molding compound mats between said mold portions, whereby said differently colored sheet molding compound mats are mingled with each other to form a flow pattern of the distinct colors of each of said sheet molding compound mats on at least one of said surfaces of said article.

2. The method as claimed in claim 1 wherein said first mold portion comprises a stationary mold portion and said second mold portion comprises a movable mold portion.

3. The method as claimed in claim 2 wherein each of the sheet molding compound mats will have a surface area ranging from about 5 to about 90% of the molding surface area of said stationary mold portion, while the total volume of said mats equals the volume of the article to be molded.

4. The method as claimed in claim 2 wherein the sheet molding compound mats are subjected to a temperature within the range of from about 100° to about 160°C and a pressure of above 20 kg/cm$^2$.

* * * * *